US012612215B2

(12) United States Patent
Aboabdo et al.

(10) Patent No.: US 12,612,215 B2
(45) Date of Patent: Apr. 28, 2026

(54) REMOVABLE LINER FOR A CONTAINER

(71) Applicant: Chubby Gorilla, Inc., Fullerton, CA (US)

(72) Inventors: Ibrahiem H. Aboabdo, Yorba Linda, CA (US); Yining Wang, Hangzhou (CN); Xing Gao, Hangzhou (CN); Zhenwei Miao, Hangzhou (CN); Xingxin Huang, Hangzhou (CN)

(73) Assignee: Chubby Gorilla, Inc., Fullerton, CA (US)

( * ) Notice: Subject to any disclaimer, the term of this patent is extended or adjusted under 35 U.S.C. 154(b) by 41 days.

(21) Appl. No.: 18/365,911

(22) Filed: Aug. 4, 2023

(65) Prior Publication Data

US 2025/0042615 A1     Feb. 6, 2025

(51) Int. Cl.
| | |
|---|---|
| B65D 25/16 | (2006.01) |
| B29C 45/00 | (2006.01) |
| B29K 83/00 | (2006.01) |
| B29L 31/00 | (2006.01) |

(52) U.S. Cl.
CPC .......... B65D 25/16 (2013.01); B29C 45/0001 (2013.01); *B29K 2083/005* (2013.01); *B29L 2031/712* (2013.01)

(58) Field of Classification Search
CPC ................................ B65D 25/14; B65D 25/18
See application file for complete search history.

(56) References Cited

U.S. PATENT DOCUMENTS

| | | | | |
|---|---|---|---|---|
| 3,670,916 | A | * | 6/1972 | Alpert ................ B65D 81/3827 |
| | | | | 220/592.2 |
| 4,555,339 | A | * | 11/1985 | Graves ................... B01D 29/01 |
| | | | | 210/244 |
| 4,993,579 | A | | 2/1991 | Burchett |
| 5,341,952 | A | * | 8/1994 | Goglio ................... B65D 77/06 |
| | | | | 229/125.09 |
| 5,372,274 | A | * | 12/1994 | Freedland ............... A47J 47/10 |
| | | | | 220/571 |
| 6,789,393 | B2 | * | 9/2004 | Dais ..................... B65D 81/382 |
| | | | | 62/112 |
| 8,820,521 | B2 | * | 9/2014 | Hodgson ................. A24F 23/00 |
| | | | | 206/265 |
| 12,064,020 | B2 | * | 8/2024 | Hwang ................ A45D 33/003 |
| 12,070,115 | B2 | * | 8/2024 | Coquard ........... A45D 40/0068 |
| 2007/0182551 | A1 | * | 8/2007 | Yang ..................... B65F 1/1638 |
| | | | | 220/908 |
| 2009/0041910 | A1 | * | 2/2009 | Rabinovitch ........ A01K 5/0128 |
| | | | | 119/61.5 |
| 2011/0248037 | A1 | * | 10/2011 | Fung ................... B65D 21/086 |
| | | | | 220/592.2 |
| 2014/0305943 | A1 | * | 10/2014 | Plott ....................... A61J 9/001 |
| | | | | 220/666 |
| 2014/0352621 | A1 | * | 12/2014 | Fairbanks ........... A01K 5/0121 |
| | | | | 119/61.5 |

(Continued)

*Primary Examiner* — Don M Anderson

(74) *Attorney, Agent, or Firm* — Knobbe, Martens, Olson & Bear, LLP

(57)     ABSTRACT

A container system is disclosed herein. The container system may include a body and a liner. The liner may be removably inserted into a recess of the body. The body may include a lip extending around the recess a distance from an opening to the recess. The liner may include a rim configured to contact the lip of the body when the liner is inserted into the recess. The liner may be configured to be turned inside out.

18 Claims, 13 Drawing Sheets

(56) References Cited

U.S. PATENT DOCUMENTS

| 2015/0122811 A1 * | 5/2015 | Tamaro | B65D 77/06 |
| | | | 220/23.89 |
| 2015/0291309 A1 * | 10/2015 | McGregor | B65D 21/086 |
| | | | 220/573.1 |
| 2018/0201408 A1 * | 7/2018 | Vaughan | A45F 3/18 |
| 2019/0307292 A1 * | 10/2019 | Haas | B65D 81/3869 |
| 2020/0071047 A1 * | 3/2020 | Chen | A45D 40/0068 |
| 2020/0216212 A1 * | 7/2020 | Spaccarelli | A47G 19/00 |
| 2020/0346820 A1 * | 11/2020 | Sa | B65D 21/086 |
| 2021/0298451 A1 * | 9/2021 | Coquard | B65D 77/0486 |
| 2021/0368960 A1 * | 12/2021 | Hwang | A45D 40/0068 |
| 2023/0054953 A1 * | 2/2023 | Graham | B65D 55/08 |
| 2023/0119726 A1 * | 4/2023 | Haas | A47J 41/024 |
| | | | 220/592.2 |
| 2023/0312178 A1 * | 10/2023 | Zastar | B65D 25/18 |
| | | | 220/62.18 |

* cited by examiner

100

102

100B

101

100A

104

101A

REMOVABLE LINER FOR A CONTAINER

FIELD

This disclosure generally relates to devices, systems, and methods for container with removable liners.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

In some embodiments, a container system can include a body including: a first recess; and a first opening to the first recess, the first opening positioned at a top end of the body; a cap configured to removably attach to the body to cover the first opening; a liner, the liner including: a second recess; a second opening to the second recess, a rim extending around the second opening; wherein the liner is configured to hold a substance in the second recess, wherein the liner is configured to be removably inserted into the first recess, and wherein the liner is configured to be turned inside out.

In some embodiments, the body can include a depression extending from the top end of the body, wherein the depression forms a gap between the rim and the body when the liner is positioned in the first recess.

In some embodiments, the rim can be recessed from the opening of the body when the liner is positioned in the first recess.

In some embodiments, the body can include a lip extending around the first recess, wherein the lip is positioned a distance from the top end of the body, and wherein the lip is configured to contact the rim of the liner when the liner is inserted into the first recess.

In some embodiments, the distance can be larger than a height of the rim so the rim is recessed from the top end of the body.

In some embodiments, a bottom of the liner can be configured to be pushed through the second opening to turn the liner inside out.

In some embodiments, the liner can include silicone and/or silicone rubber.

In some embodiments, the liner can be flexible and/or heat resistant.

In some embodiments, the rim can be rigid or semi-rigid.

In some embodiments, a liner configured to be removably inserted into a container can include a bottom positioned at a first end; a sidewall coupled to a perimeter of the bottom, wherein the bottom and the sidewall form a recess; an opening to the recess at a second end; and a rim extending radially outward from the sidewall, wherein the rim defines the opening, wherein the sidewall and the bottom are flexible so the liner is configured to be turned inside out.

In some embodiments, the rim can be rigid or semi-rigid.

In some embodiments, the liner can include silicone and/or silicone rubber.

In some embodiments, the liner can be configured to be inserted into a second recess of a container via a second opening.

In some embodiments, the rim can be configured to contact a lip in the second recess when the liner is inserted into the second recess of the container.

In some embodiments, the rim can include a height and the lip is positioned a distance from the second opening, and wherein the distance is larger than the height of the rim.

In some embodiments, a container can include a body including: a recess; an opening to the recess, the opening positioned at a top end of the body; and a lip positioned in the recess a distance from the opening; a cap configured to removably attach to the body to cover the opening, wherein the recess is configured to receive a liner so a rim of the liner contacts the lip when the liner is inserted into the recess.

In some embodiments, the liner can be configured to be turned inside out.

In some embodiments, the rim of the liner can include a height, wherein the height is smaller than the distance.

In some embodiments, the container, can include a seal, wherein the seal is positioned between the cap and the body when the cap is attached to the body.

In some embodiments, the body can include a depression extending from the top end of the body, wherein the depression forms a gap between the rim and the body when the liner is positioned in the recess.

In some embodiments, a method of manufacturing a liner can include the steps of: injecting molding an elastomer to form the liner including: a bottom positioned at a first end; a sidewall coupled to a perimeter of the bottom, wherein the bottom and the sidewall form a recess; an opening to the recess at a second end; and a rim extending radially outward from the sidewall, wherein the rim defines the opening, wherein the sidewall and the bottom are flexible so the liner is configured to be turned inside out.

In some embodiments, the elastomer can include silicone and/or silicone rubber.

In some embodiments, a method of assembling a container can include the steps of: inserting a liner into a first recess of a body of the container, the liner including: a bottom positioned at a first end; a sidewall coupled to a perimeter of the bottom, wherein the bottom and the sidewall form a second recess; an opening to the second recess at a second end; and a rim extending radially outward from the sidewall, wherein the rim defines the opening, wherein the sidewall and the bottom are flexible so the liner is configured to be turned inside out, wherein the rim of the liner contacts a lip in the first recess of the body when the liner is inserted into the first recess of the body.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Although several embodiments, examples, and illustrations are disclosed below, it will be understood by those of ordinary skill in the art that the system, methods, and devices described herein extend beyond the specifically disclosed embodiments, examples, and illustrations and includes other uses of the system, methods, and devices and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the system, methods, and devices herein described.

FIGS. 1A-1F illustrate a container 100. In some embodiments, the container 100 can include one or more features of a container or bottle as described in U.S. patent application Ser. No. 17/112,080, the entirety of which is hereby incorporated by reference.

The container 100 can include a first end 100A and a second end 100B opposite the first end 100A. The container 100 can include a height 101 between the first end 100A and the second end 100B. In some embodiments, the height 101 can include a distance of about 1.00 inches, about 1.10 inches, about 1.20 inches, about 1.30 inches, about 1.40 inches, about 1.50 inches, about 1.54, about 1.60 inches, about 1.70 inches, about 1.80 inches, about 1.90 inches, about 2.00 inches, about 2.50 inches, about 3.00 inches, about 3.50 inches, about 4.00 inches, and/or any value between the aforementioned values. In some embodiments, the height 101 can include a distance between about 1.00 inches and about 2.00 inches. In some embodiments, the height 101 can include a distance between about 1.40 inches and about 1.60 inches.

The container 100 can include a width 101A (i.e., diameter). In some embodiments, the width 101A can include a distance of about 1.00 inches, about 1.10 inches, about 1.20 inches, about 1.30 inches, about 1.40 inches, about 1.50 inches, about 1.60, about 1.64 inches, about 1.70 inches, about 1.80 inches, about 1.90 inches, about 2.00 inches, about 2.50 inches, about 3.00 inches, about 3.50 inches, about 4.00 inches, and/or any value between the aforementioned values. In some embodiments, the width 101A can include a distance between about 1.00 inches and about 2.00 inches. In some embodiments, the height 101 can include a distance between about 1.50 inches and about 1.70 inches.

Figure 1A:
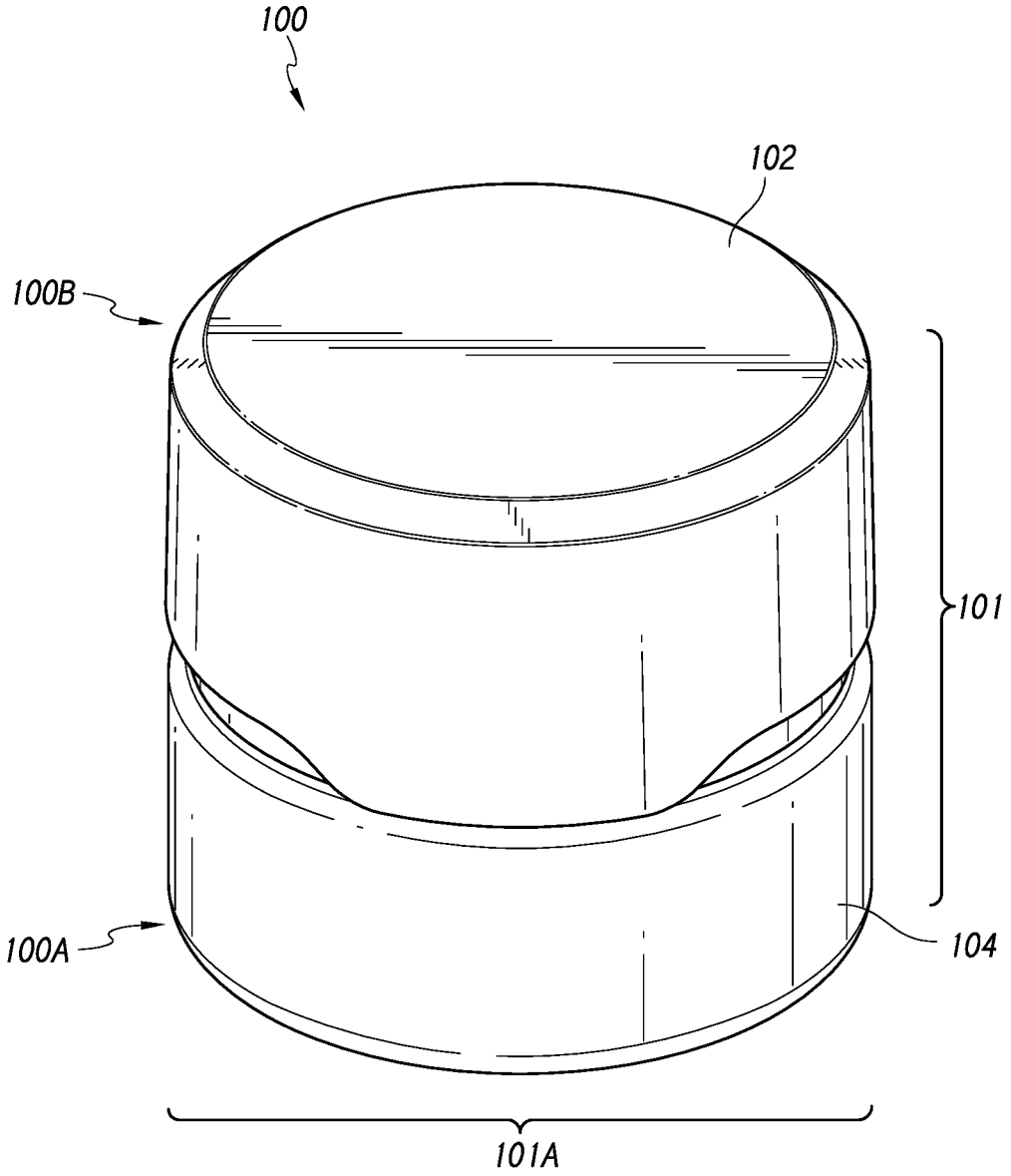
FIG. 1A illustrates a perspective view of container with a removable liner.
Figure 1B:
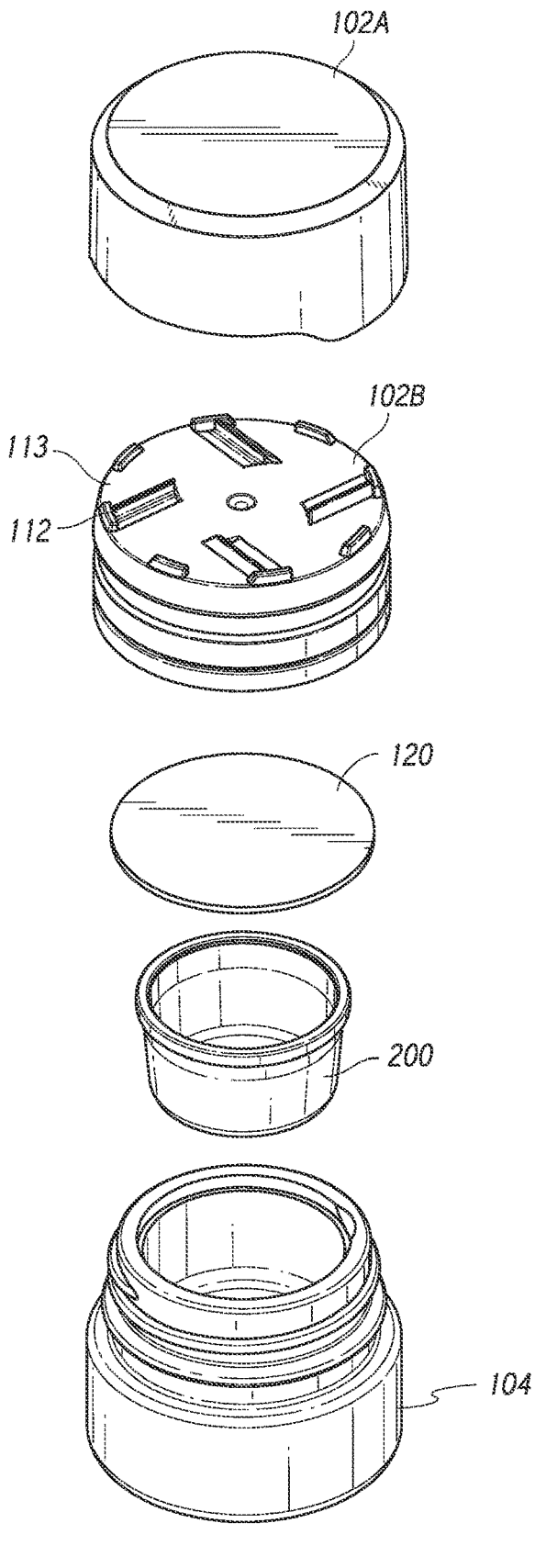
FIG. 1B illustrates an exploded view of the container with a removable liner of FIG. 1A.
Figure 1C:
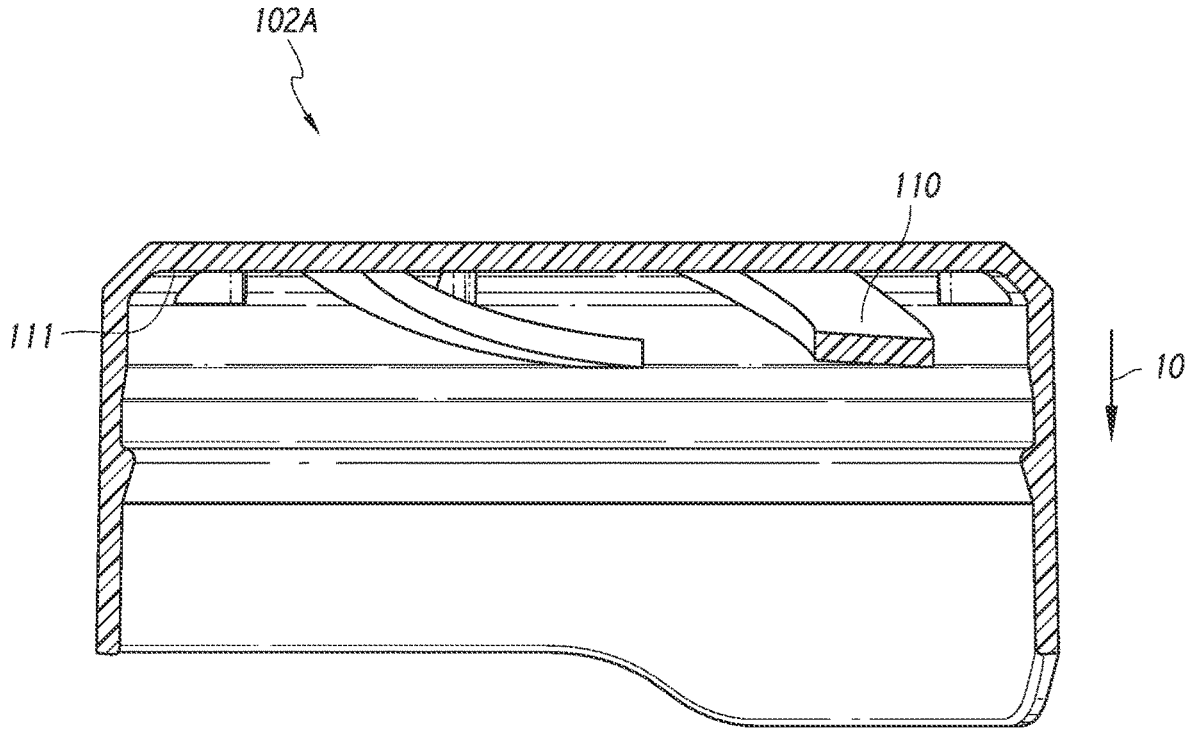
FIG. 1C illustrates a section view of an outer cap of the container of FIG. 1A.

The container 100 can include a cap 102 and a body 104. The body 104 can include a first end 104A and a second end 104B (i.e., top end). The body 104 can include a neck portion 103 at the second end 104B. The neck portion 103 can define an opening 106 into a recess 105 at the second end 104B of the body 104. As shown in FIG. 1E, the recess 105 can be configured to hold or contain one or more substances 302. In some embodiments, the one or more substances 302 can include dry goods, oil, waxes, or other substances.

The cap 102 can be removable and attachable with the body 104 for opening and closing the opening 106 of the body 104. As shown in FIG. 1B, the cap 102 can include an outer cap 102A and an inner cap 102B. The inner cap 102B can circumferentially rotate relative to the body 104 to couple or attach the cap 102 to the body 104 and/or uncouple or remove the cap 102 from the body 104. The inner cap 102B can include cap threads 107, as shown in FIG. 1F, and the body 104 can include body threads 108. The body threads 108 can be positioned or located on the neck portion 103 of the body 104. When the inner cap 102B circumferentially rotates in a first circumferential direction (i.e., a tightening direction) relative to the body 104, the cap threads 107 can engage with the body threads 108 to couple or attach the cap 102 to the body 104. When the inner cap 102B rotates in a second circumferential direction opposite the first circumferential direction (i.e., a loosening direction) relative to the body 104, the cap threads 107 can disengage the body threads 108 to decouple or remove the cap 102 from the body 104.

In some embodiments, the outer cap 102A can be configured to enclose the inner cap 102B and/or the inner cap 102B can be nested in the outer cap 102A. The outer cap 102A can be configured to circumferentially rotate relative to the inner cap 102B and/or the body 104. The outer cap 102A can be configured to interact with the inner cap 102B so the inner cap 102B can circumferentially rotate when the outer cap 102A circumferentially rotates.

In some embodiments, the inner cap 102B can be movable with respect to the outer cap 102A along an axial or longitudinal direction. As shown in FIG. 1C, in some embodiments, the outer cap 102A can include one or more spring members 110. The one or more spring members 110 can extended from an inner surface 111 of the outer cap 102A. The one or more spring members 110 can apply a force to a top surface 113 of the inner cap 102B to space the outer cap 102A and/or the inner surface 111 of the outer cap 102A from the inner cap 102B and/or the top surface 113 of the inner cap 102B.

In some embodiments, the inner cap 102B can include one or more protrusions 112 on the top surface 113 of the inner cap 102B. The one or more protrusions 112 can be configured to interact with the one or more spring members 110 of the outer cap 102A. In some embodiments, a rotational force can be applied to the outer cap 102A to circumferentially rotate the outer cap 102A in the first circumferential direction and/or the second circumferential direction. When the rotational force is applied to the outer cap 102A to circumferentially rotate the outer cap 102A in the first circumferential direction, the one or more spring members 110 can be configured engage with the one or more protrusions 112 of the inner cap 102B to transfer the rotational force on the outer cap 102A to the inner cap 102B and circumferentially rotate the inner cap 102B in the first circumferential direction. When the inner cap 102B circumferentially rotates in the first circumferential direction, the cap threads 107 can engage the body threads 108 to couple or attach the inner cap 102B and/or the cap 102 to the body 104.

In some embodiments, when the rotational force is applied to the outer cap 102A to circumferentially rotate the outer cap 102A in the second circumferential direction, the one or more spring members 110 can be configured to move or slide over the one or more protrusions 112 of the inner cap 102B and/or the rotational force applied to the outer cap 102A can not be transferred to the inner cap 102B. Accordingly, the outer cap 102A can rotate independently of and/or relative to the inner cap 102B in the second direction.

In some embodiments, a force 10 can be applied to the outer cap 102A to overcome the force the one or more spring members 110 can apply to the top surface 113 of the inner cap 102B and compress the one or more spring members 110. The force 10 can move the outer cap 102A and/or the inner surface 111 of the outer cap 102A towards the inner cap 102B and/or the top surface 113 of the inner cap 102B so the outer cap 102A and/or the inner surface 111 of the outer cap 102A can contact the inner cap 102B and/or the top surface 113 of the inner cap 102B. Accordingly, when the rotational force is applied to the outer cap 102A to circumferentially rotate the outer cap 102A in the second circumferential direction, the force 10 can applied to the outer cap 102A to transfer the rotational force to the inner cap 102B and circumferentially rotate the inner cap 102B in the second circumferential direction. When the inner cap 102B circumferentially rotates in the second circumferential direction, the cap threads 107 can disengage the body threads 108 to decouple or remove the inner cap 102B and/or the cap 102 from the body 104.

Figure 1D:
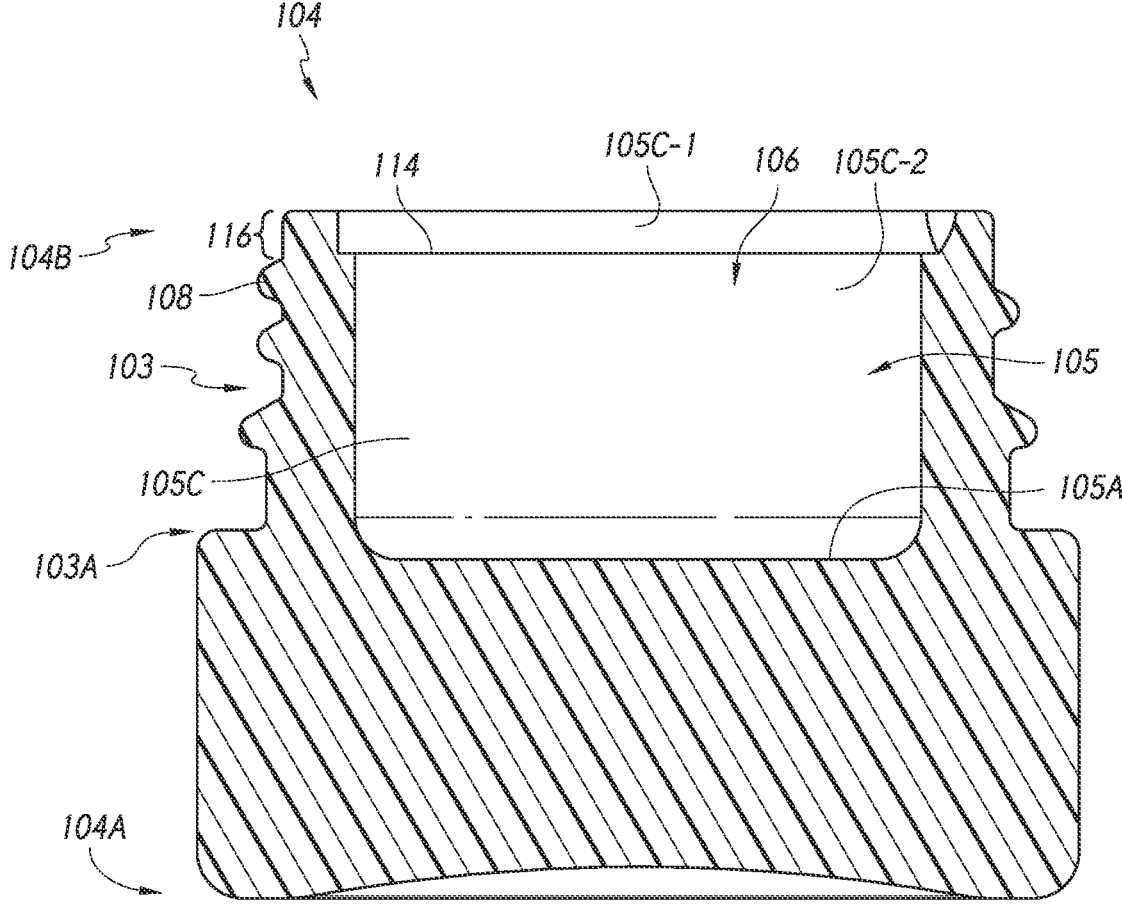
FIG. 1D illustrates a section view of a body of the container of FIG. 1A.
Figure 1E:
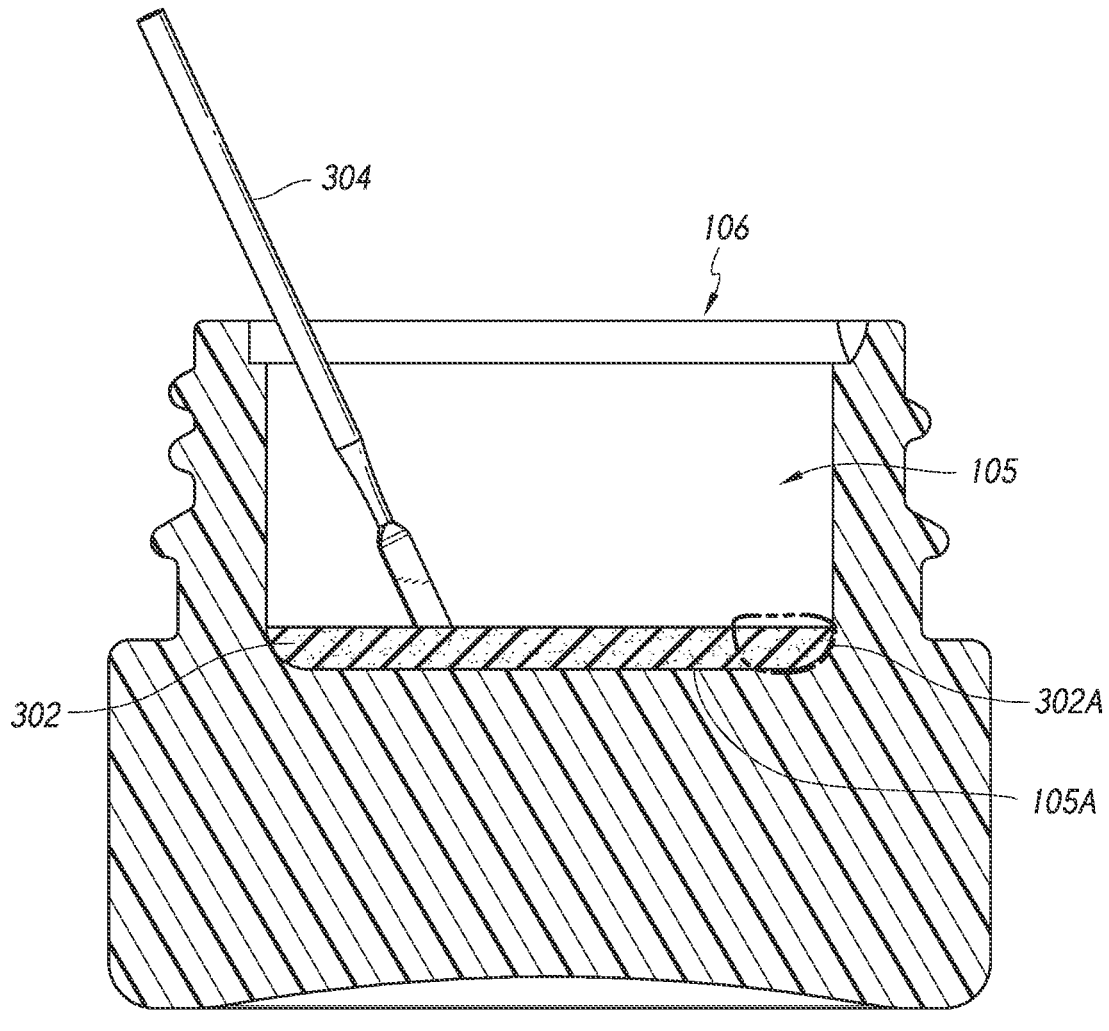
FIG. 1E illustrates another section view of the body of the container of FIG. 1A.
Figure 1F:
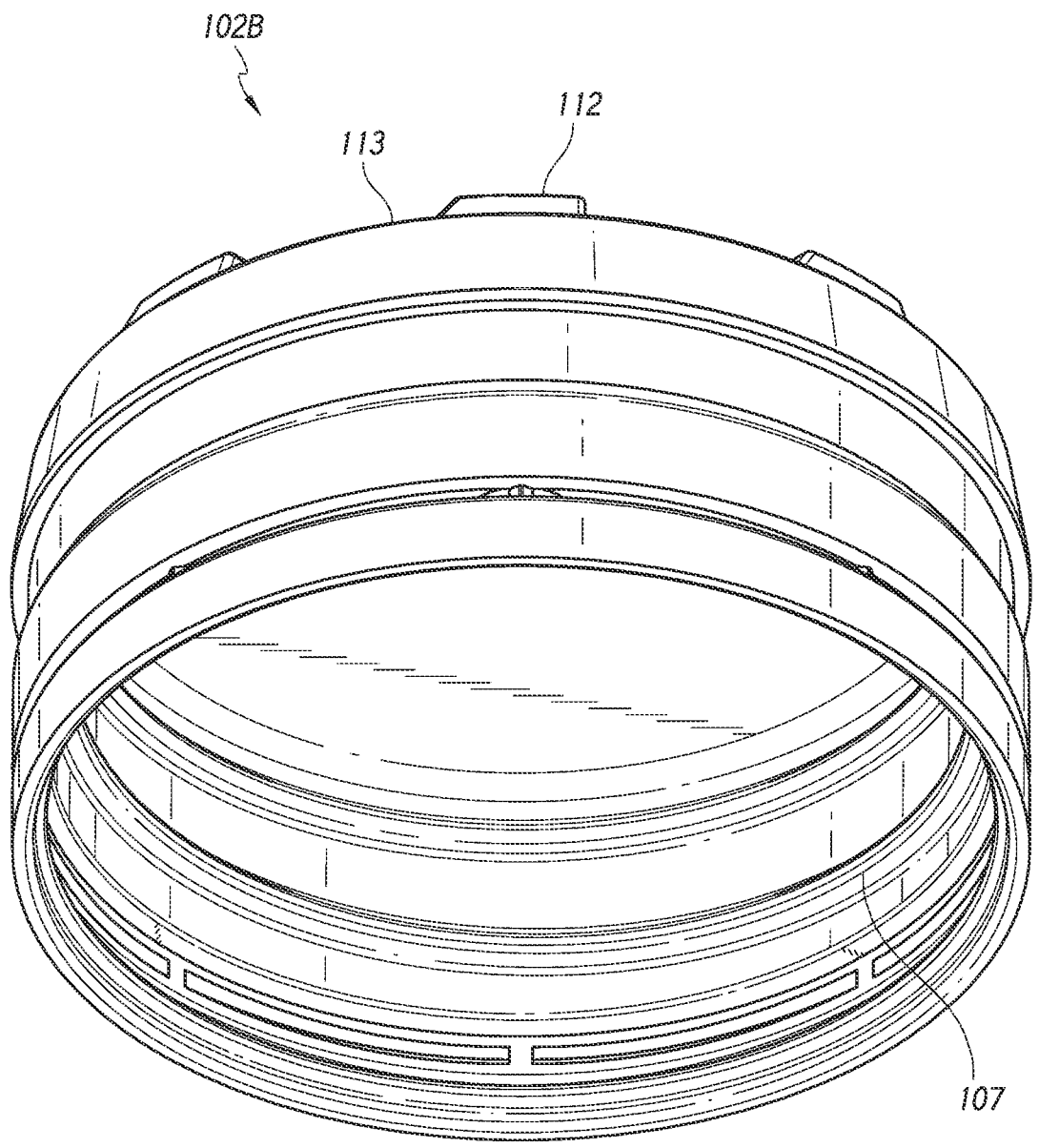
FIG. 1F illustrates a perspective view of an inner cap of the container of FIG. 1A.

In some embodiments, as shown in FIG. 1D, the body 104 can include a bottom surface 105A and a sidewall 105C. The bottom surface 105A and the sidewall 105C can define the recess 105. In some embodiments, the sidewall 105C can include a lip 114. The lip 114 can be positioned or located a distance 116 from the opening 106. A portion 105C-1 of the sidewall 105C between the lip 114 and the opening 106 can be offset a distance 118 radially outward from a portion 105C-2 of the sidewall 105C between the lip 114 and the bottom surface 105A of the recess 105.

In some embodiments, the recess 105 can extend to a bottom end 103A of the neck portion 103, wherein the bottom end 103A of the neck portion 103 is opposite the opening 106. In some embodiments, the recess 105 can extend past the bottom end 103A of the neck portion 103 so the bottom surface 105A of the recess 105 is positioned between the bottom end 103A of the neck portion 103 and the and the first end 104A of the body 104.

In some embodiments, the container 100 can include a seal 120. The seal 120 can be formed of a polymer, thermoplastic elastomer (TPE), rubber, silicon, or other material. The seal 120 can be an O-ring, circular disk, or other shape that correspond to the shape of the opening 106 of the body 104. In some embodiments, the seal 120 can be induction sealed to the body 104. The seal 120 can be configured to indicate if the container 100 has been tampered (i.e., the seal 120 was previously removed from the opening 106 and/or the one or more substances 302 in the recess 105 have been manipulated). The seal can be configured to hermetically seal (i.e., airtight seal) the opening 106 and/or the recess 105 to prevent or inhibit contaminants from entering the recess 105 and/or to maintain freshness of the one or more substances 302 in the recess 105.

In some embodiments, the one or more substances 302 can be in a solid state or a viscous liquid state at or about room temperature, and/or a liquid state at higher temperatures, for example, between about 200 degrees Celsius and about 300 degrees Celsius. In some embodiments, the one or more substances 302 can transition from the solid state or the viscous liquid state to the liquid state and/or transition from the liquid state to the solid state or the viscous liquid state at a particular temperature.

The container 100 can be configured to hold or contain the one or more substances 302 in the recess 105 of the body 104. The one or more substances 302 can be placed or inserted into the recess 105 via the opening 106. In some embodiments, the one or more substances 302 can be placed or inserted into the recess 105 when the one or more substances 302 are in the liquid state or the viscous liquid state. When the one or more substances 302 are in the liquid or the viscous liquid state, the one or more substances 302 can flow along a bottom surface 105A of the recess 105 so the one or more substances 302 cover the bottom surface 105A of the recess 105. In some embodiments, the one or more substances 302 can be placed or inserted into the recess 105 at a temperature above the particular temperature when the one or more substances 302 are in the liquid state. When the one or more substances 302 cool below the particular temperature, the one or more substances 302 can transition from the liquid state and the one or more substances 302 can be a same shape as the recess 105.

In some embodiments, as shown in FIG. 1E, a removal tool 304 can be used to remove the one or more substances 302 from the container 100. A user can scrape or otherwise manipulate the one or more substances 302 with the removal tool 304 to remove the one or more substances 302 from the recess 105 of the body 104 and/or the container 100. To insert the removal tool 304 through the opening 106, a size of the removal tool 304 can be smaller than a size of the opening 106 of the body 104. Accordingly, the removal tool 304 can not scrape or otherwise manipulate all or substantially all of the one or more substances 302 at a time. Due to the size of the removal tool 304 and/or the size of the opening 106 of the body 104 the user can have to insert the removal tool 304 multiple times to remove all of the one or more substances 302 in the container. Additionally, a portion 302A of the one or more substances 302 positioned at or near the perimeter 105B of the bottom surface 105A of the recess 105 can be difficult to remove scrape or manipulate with the removal tool 304. Accordingly, the user can have to heat the one or more substances 302 and the body 104 to remove the one or more substances 302 from the recess 105.

Figure 2A:
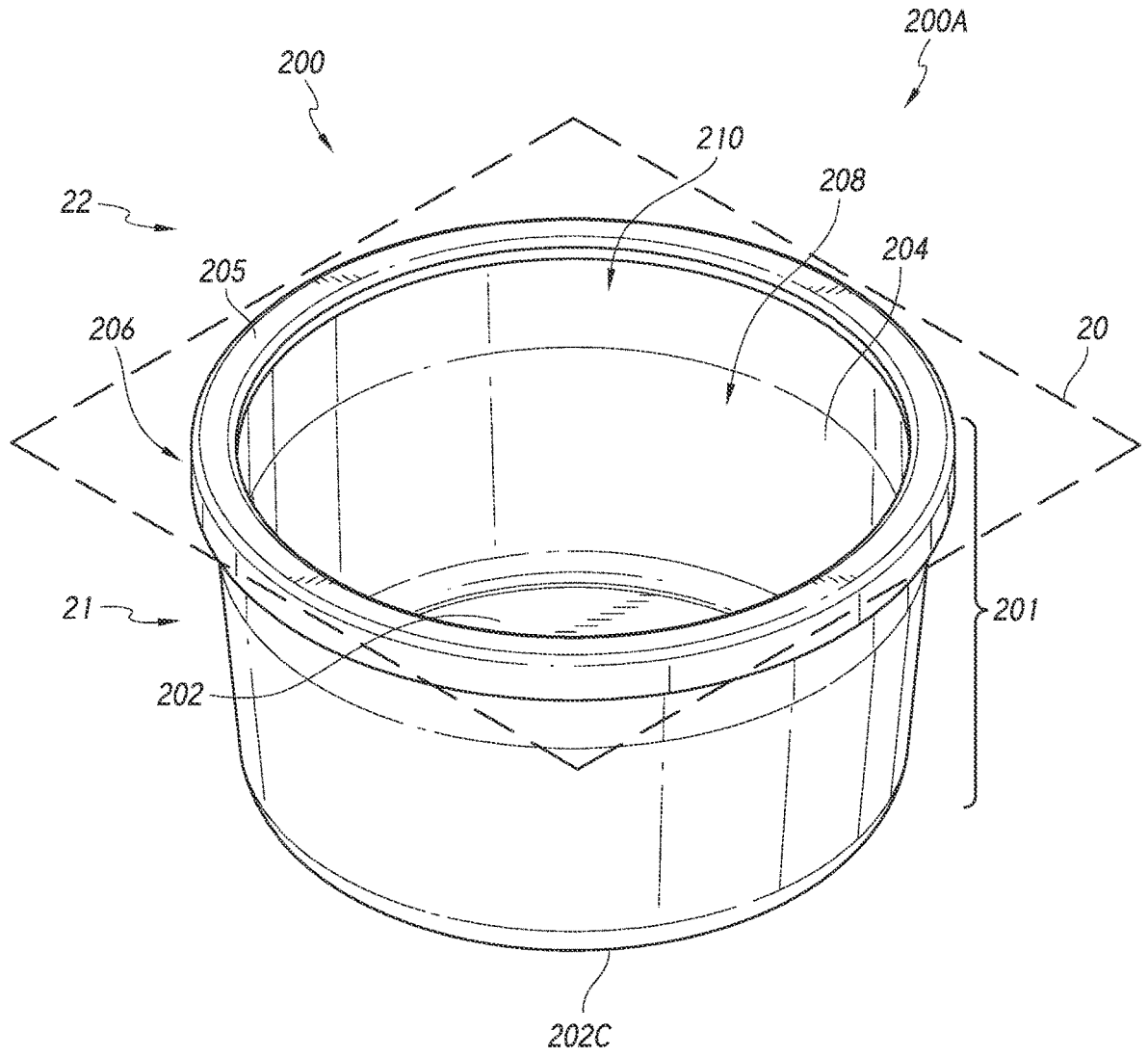
FIG. 2A illustrates a perspective view of a removable liner.
Figure 2B:
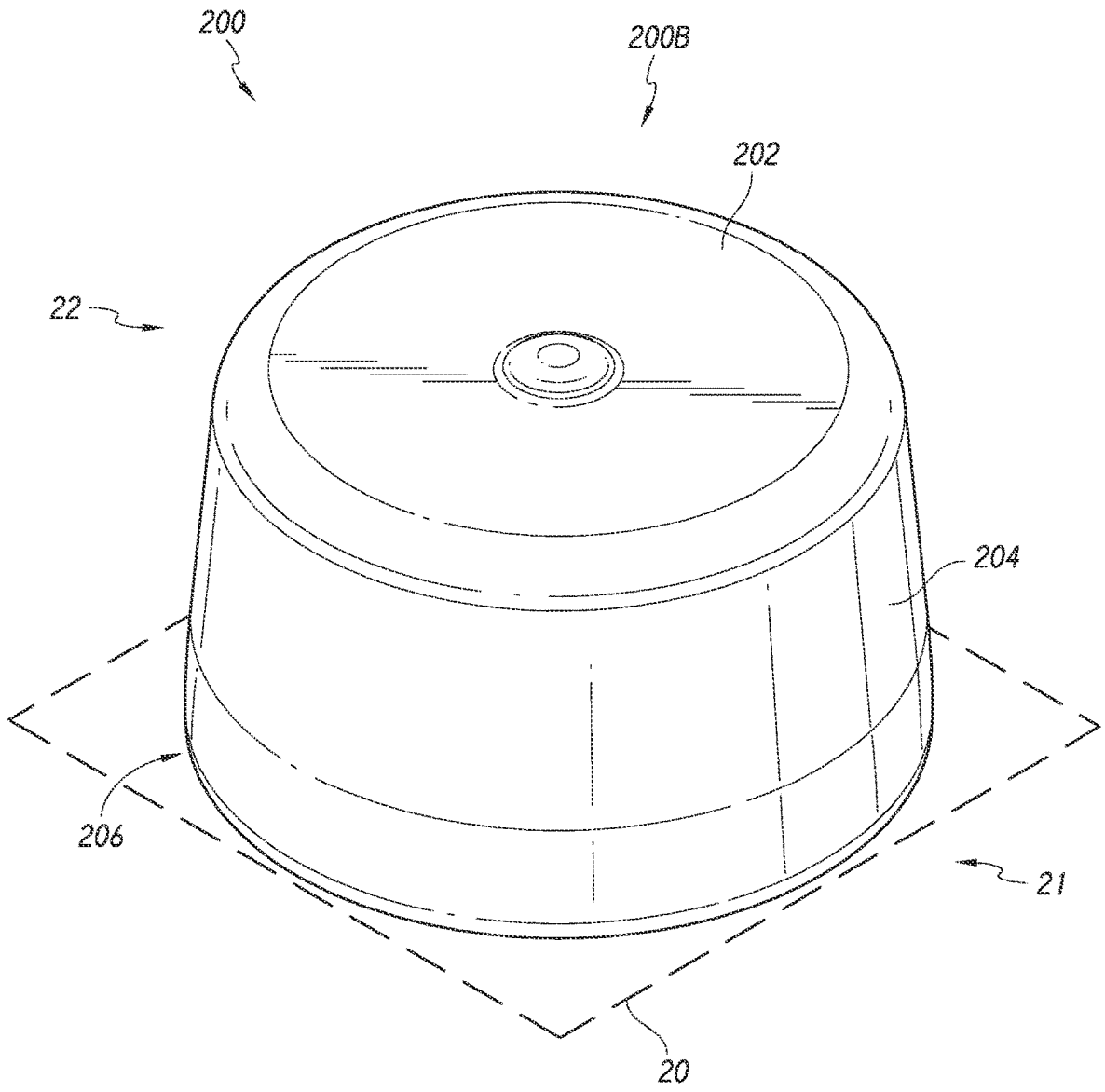
FIG. 2B illustrates a perspective view of the removable liner of FIG. 2A in an inside out configuration.
Figure 2C:
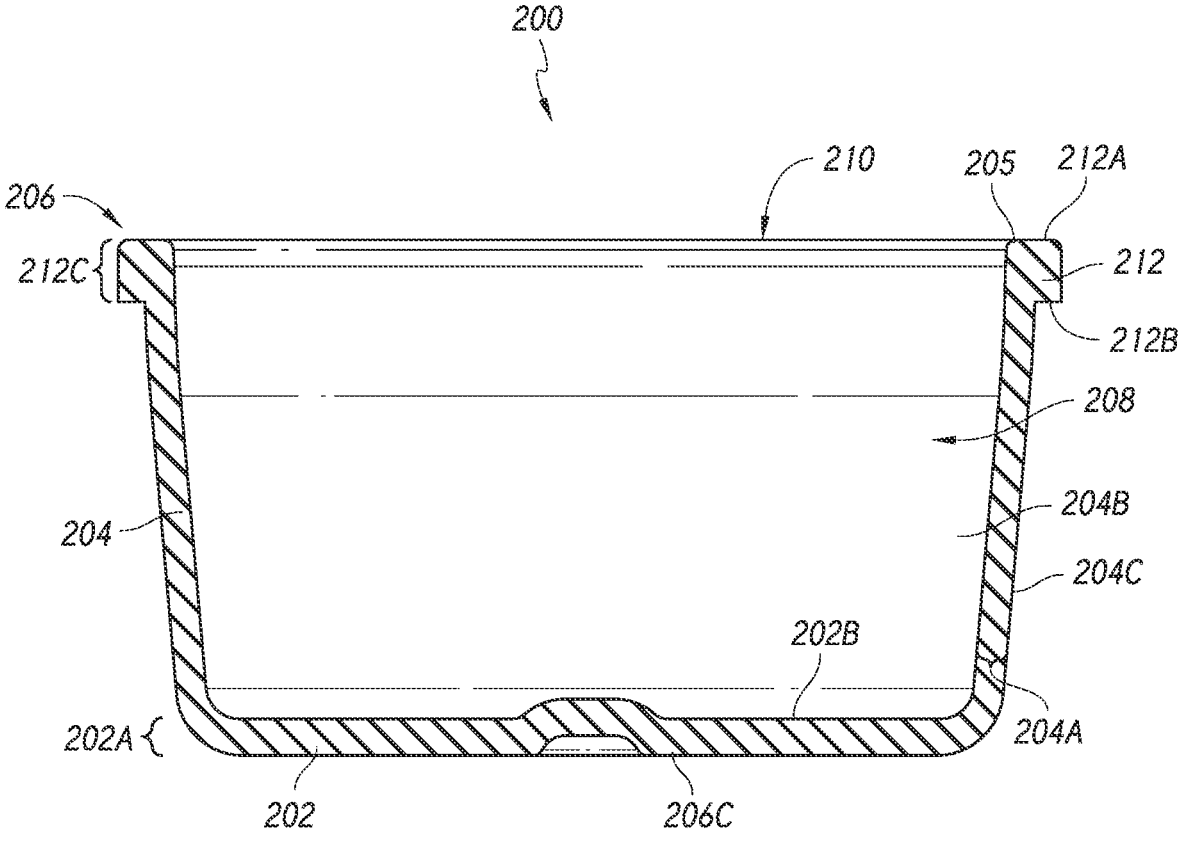
FIG. 2C illustrates a section view of the removable liner of FIG. 2A

In some embodiments, the container 100 can include a liner 200, as shown in FIGS. 2A-2C. The liner 200 can include a bottom 202, and/or a sidewall 204. The sidewall 204 can be coupled or attached to a perimeter of the bottom 202 and the sidewall 204 can extend from the from the bottom 202 to a top end 206 of the liner 200 opposite the bottom 202. The sidewall 204 can include a top surface 205 at the top end 206 of the liner 200. The bottom 202 and the sidewall 204 can define a recess 208 between the top end 206 of the liner 200 and the bottom 202. The sidewall 204 can define an opening 210 to the recess 208 at the top end 206 of the liner 200. In some embodiments, the liner 200 can include a height 201 between an outer surface 202C of the bottom 202 and the top end 206 of the liner 200.

The bottom 202 can include a thickness 202A. The thickness 202A can include a distance between an inner surface 202B of the bottom 202 and an outer surface 202C of the bottom 202. In some embodiments, the thickness 202A can be constant across the bottom 202. In some embodiments, the thickness 202A can vary across the bottom 202. The sidewall 204 can include a thickness 204A.

The thickness 204A can include a distance between an inner surface 204B of the sidewall 204 and an outer surface 204C of the sidewall 204. In some embodiments, the thickness 204A can be constant along a height of the sidewall 204 between the bottom 202 and the top end 206 of the sidewall 204. In some embodiments, the thickness 204A can vary along the height of the sidewall 204 between the bottom 202 and the top end 206 of the sidewall 204. In some embodiments, the thickness 202A of the bottom 202 and the thickness 204A of the sidewall 204 can include a same distance. In some embodiments, the thickness 202A of the bottom 202 and the thickness 204A of the sidewall 204 can each include a different distance.

Figure 3A:
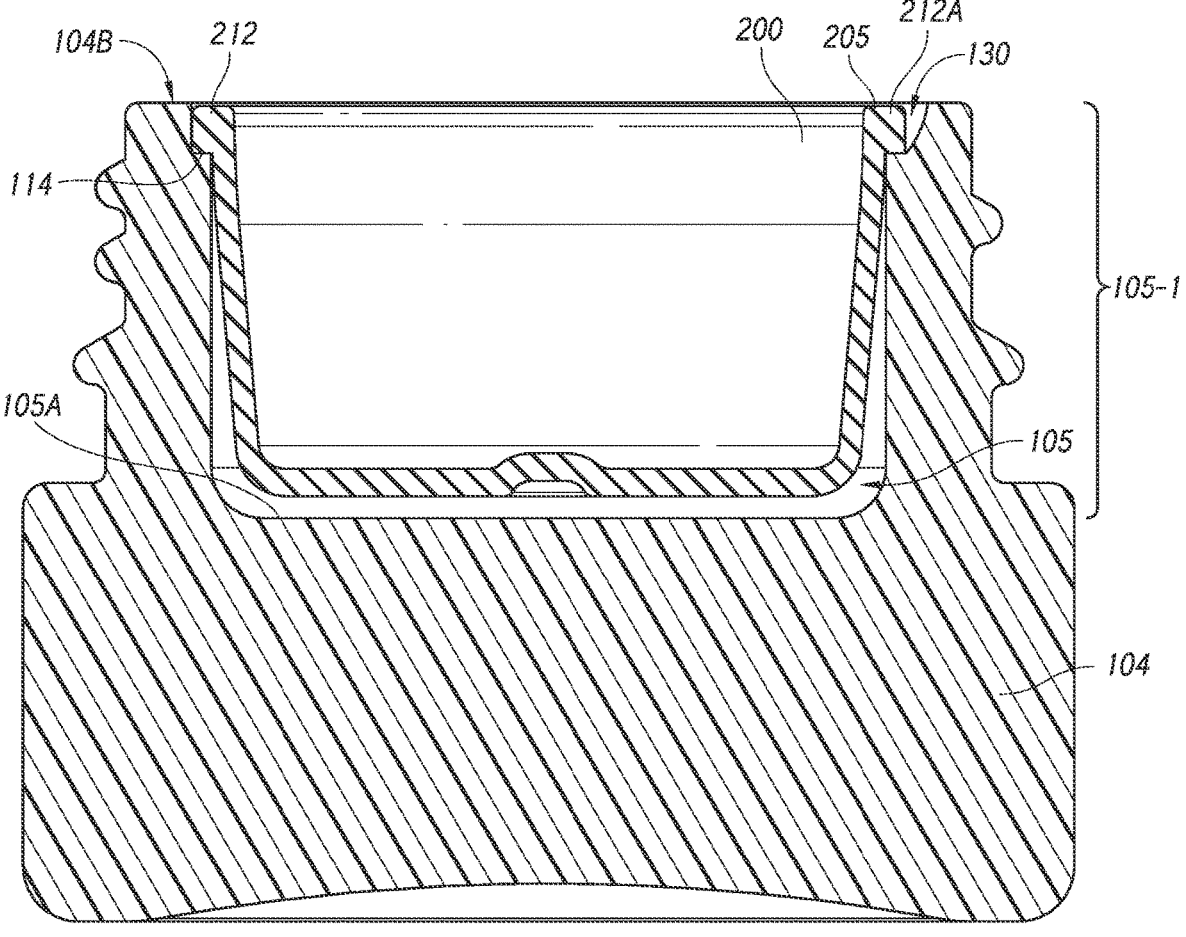
FIG. 3A illustrates a section view of the container with a removable liner of FIG. 1A without a cap.
Figure 3B:
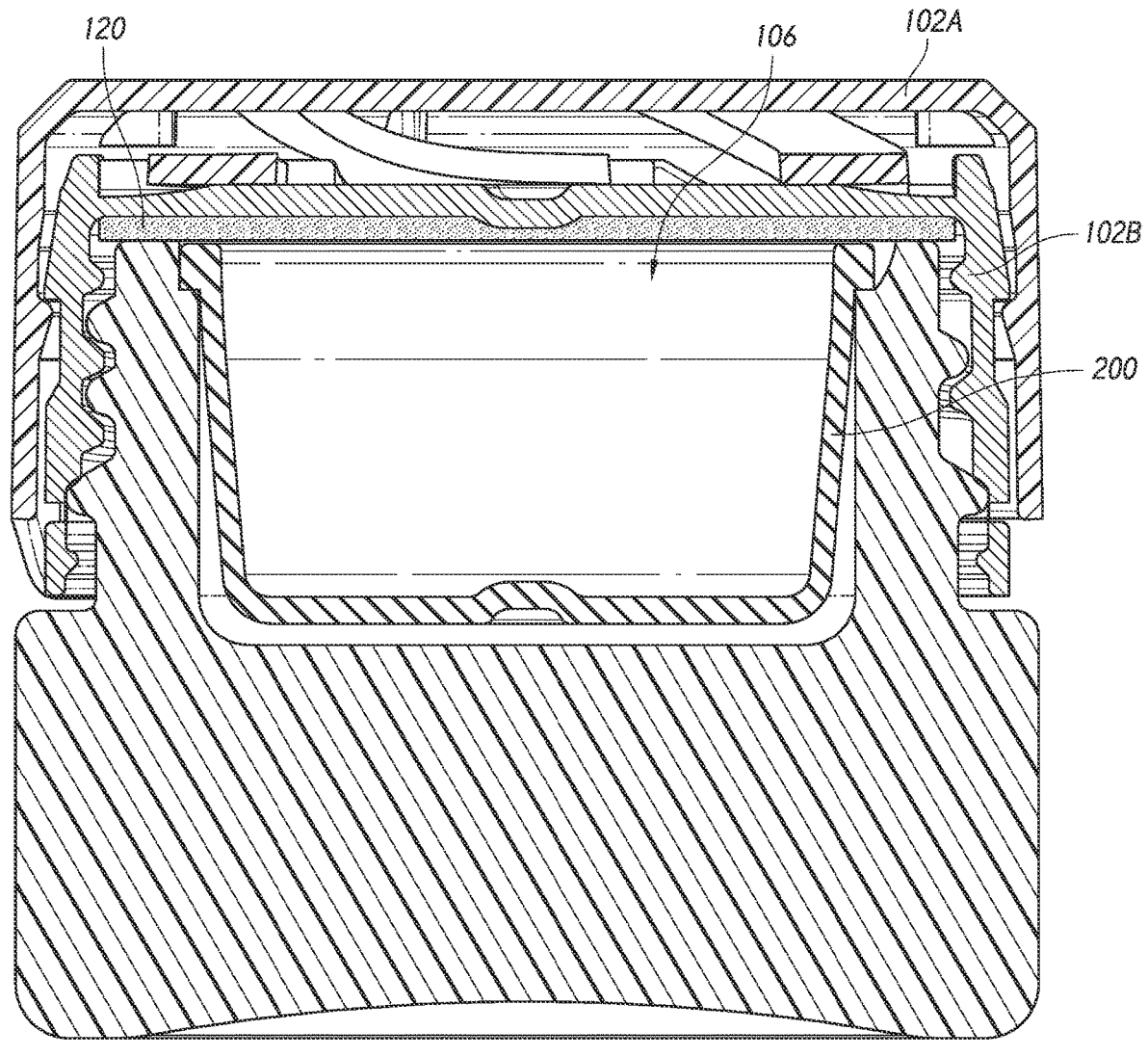
FIG. 3B illustrates a section view of the container with a removable liner of FIG. 1A with a cap.

As shown in FIGS. 3A and 3B, the liner 200 can be removably inserted into the recess 105 of the body 104. In some embodiments, the height 201 of the liner 200 can be smaller than a depth 105-1 of the recess 105 so the bottom 202 of the liner 200 is positioned a distance from the bottom surface 105A of the recess 105 when liner 200 is inserted into and/or positioned in the recess 105 of the body 104. In some embodiments, the height 201 of the liner 200 can be the depth 105-1 of the recess 105 so the bottom 202 of the liner 200 contacts the bottom surface 105A of the recess 105 when liner 200 is inserted into and/or positioned in the recess 105 of the body 104.

In some embodiments, when the liner 200 is inserted into and/or positioned in the recess 105 of the body 104, a rim 212 of the liner 200 can contact the lip 114. In some embodiments, the liner 200 and/or the rim 212 can be stretch fit over the lip 114 to removably secure the liner 200 and/or the rim 212 to the lip 114. The rim 212 can be rigid or semi-rigid so the rim 212 remains substantially the same size and shape if the opening 210 and/or rim 212 is stretched or compressed.

In some embodiments, as shown in FIG. 2C, the rim 212 can be positioned at the top end 206 of the sidewall 204. The rim 212 can border and/or define the opening 210 of the liner 200. The rim 212 can extend radially outward from the outer surface 204C of the sidewall 204. The rim 212 can include a top surface 212A and a bottom surface 212B. The top surface 212A can be coplanar with the top surface 205 of the sidewall 204. When the liner 200 is inserted into and/or positioned in the recess 105 of the body 104, the bottom surface 212B can contact the lip 114.

As shown in FIG. 2C, the rim 212 can include a height 212C between the top surface 212A and the bottom surface 212B. In some embodiments, the height 212C of the rim 212 can be a same distance as the distance 116. Therefore, as shown in FIGS. 3A and 3B, when the liner 200 is inserted into and/or positioned in the recess 105 of the body 104 the top surface 212A of the rim 212 and the top surface 205 of the sidewall 204 can be positioned coplanar with the opening 106 and/or the second end 104B of the body 104. In some embodiments, the height 212C of the rim 212 can be a distance less than the distance 116. Therefore, when the liner 200 is inserted into and/or positioned in the recess 105 of the body 104 the top surface 212A of the rim 212 and the top surface 205 of the sidewall 204 can be positioned below opening 106 and/or the second end 104B of the body 104 (i.e., in the recess 105). Therefore, the rim 212 can be recessed from the opening 106 and/or the second end 104B of the body 104. Accordingly, the liner 200 can not, obstruct, prevent or inhibit the cap 102 from being attached to the body 104 with the seal 120 positioned over the opening 106, as shown in FIG. 3B.

In some embodiments, as shown in FIG. 3A, the body 104 can include a depression 130. The depression 130 can be positioned in the portion 105C-1 of the sidewall 105C between the lip 114 and the opening 106. The depression 130 can extend from the second end 104B of the body 104. When the liner 200 is inserted into and/or positioned in the recess 105 of the body 104, the depression 130 can define or form a gap between the rim 212 and the sidewall 105C in order to provide access the rim 212 and/or bottom surface 212B of the rim 212. Accordingly, an item (e.g., a finger, a coin, etc.) can be inserted into the depression 130 in order to remove the liner 200 from the recess 105.

In some embodiments, the liner 200 can be flexible, bendable, reversible, or invertible, such that it can be turned inside-out. In some embodiments, the liner 200 can configured to be exposed to a temperature up to about 200 degrees Celsius, about 210 degrees Celsius, about 220 degrees Celsius, about 230 degrees Celsius, about 240 degrees Celsius, about 250 degrees Celsius, about 260 degrees Celsius, about 270 degrees Celsius, about 280 degrees Celsius, about 290 degrees Celsius, about 300 degrees Celsius, about 310 degrees Celsius, about 320 degrees Celsius, about 330 degrees Celsius, about 340 degrees Celsius, about 350 degrees Celsius, about 400 degrees Celsius, and/or any value between the aforementioned values. In some embodiments, the liner 200 can include silicone, silicone rubber, and/or any other flexible and/or heat resistant elastomer. In some embodiments, the liner 200 can be formed or manufactured via injection molding, or the like. The liner 200 can be formed by injecting silicone, silicone rubber, and/or any other flexible and/or heat resistant elastomer into a mold.

In some embodiments, the bottom 202 of the liner 200 can be pushed, moved, or otherwise translated through the opening 210 to turn the liner 200 inside-out. The liner 200 can be configured to be flexed, bent, or moved between a first configuration 200A, as shown in FIG. 2A, and a second configuration 200B, as shown in FIG. 2B. When the liner 200 is in the first configuration 200A, the bottom 202 can be positioned on a first side 21 of a plane 20 coplanar with the opening 210. When the liner 200 is in the second configuration 200B, the bottom 202 can be positioned on a second side 22 of the plane 20 coplanar with the opening 210. When the liner is in the second configuration 200B the liner 200 can be inside-out. In some embodiments, the bottom 202 of the liner 200 can be pushed, moved, or otherwise translated through the opening 210 to move the bottom 202 of the liner 200 from the first side 21 of the plane 20 (i.e., the first configuration 200A) to the second side 22 of the plane 20 (i.e., the second configuration 200B). In some embodiments, the bottom 202 of the liner 200 can be pushed, moved, or otherwise translated through the opening 210 to move the bottom 202 of the liner 200 from the second side 22 of the plane 20 (i.e., the second configuration 200B) to the first side 21 of the plane 20 (i.e., the first configuration 200A).

Figure 4A:
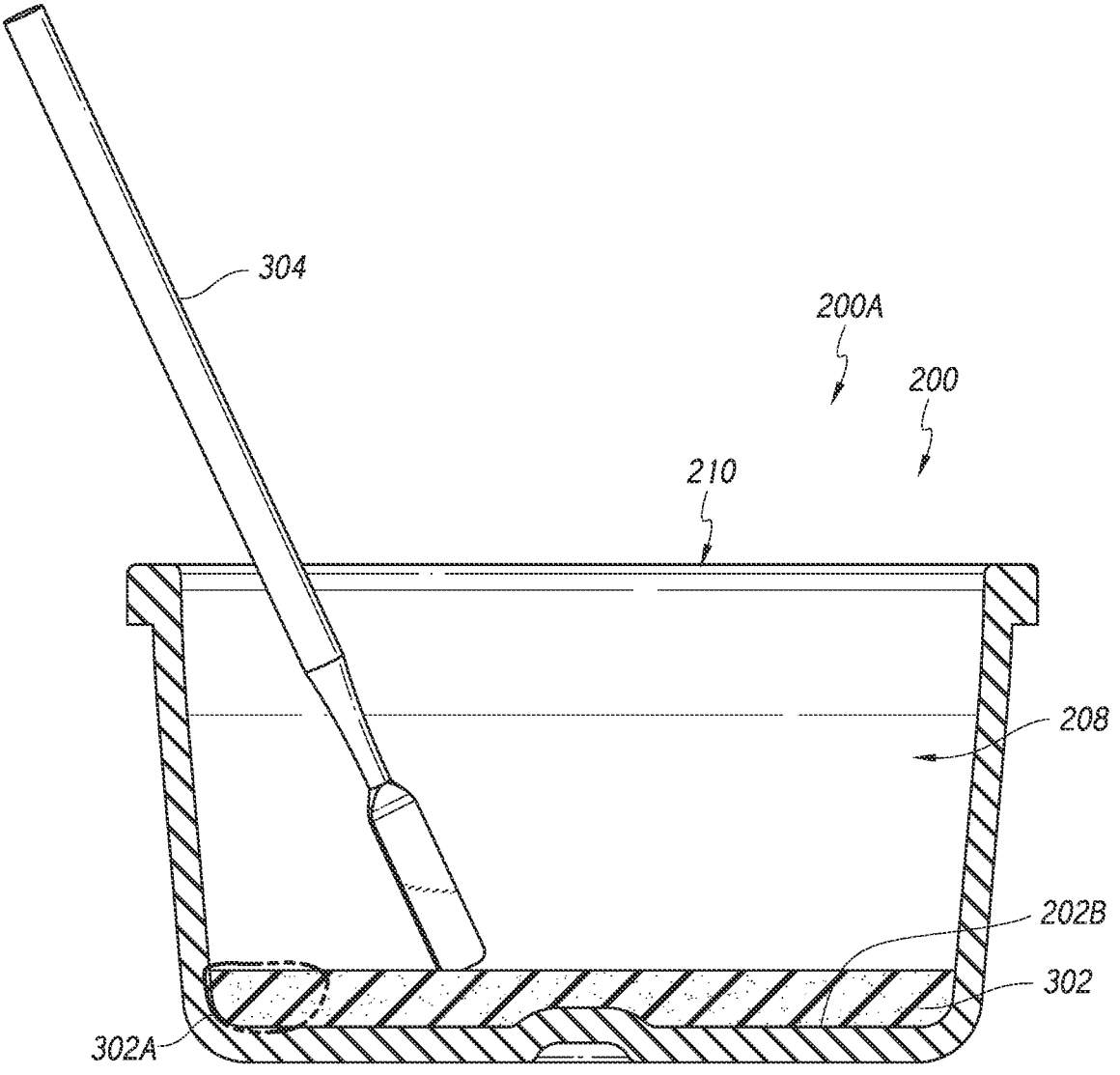
FIG. 4A illustrates a section view of the removable liner of FIG. 2A.
Figure 4B:
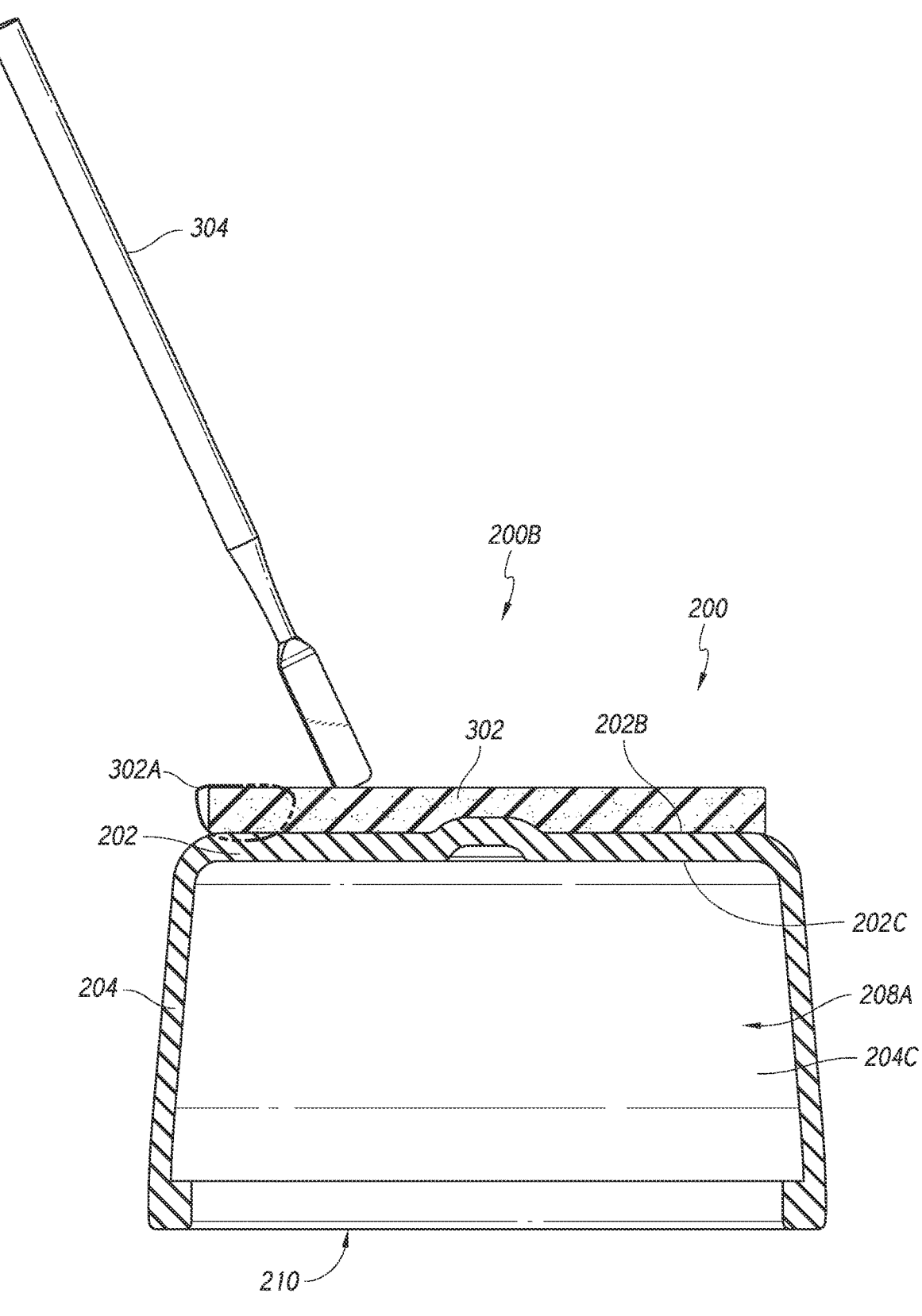
FIG. 4B illustrates a section view of the removable liner of FIG. 2A in an inside out configuration.

In some embodiments, when the liner 200 is in the first configuration 200A, the inner surface 202B of the bottom 202 and the inner surface 204B of the sidewall 204 can define the recess 208 of the liner 200 positioned on the first side 21 of the plane 20. In some embodiments, when the liner 200 is in the second configuration 200B, the outer surface 202C of the bottom 202 and the outer surface 204C of the sidewall 204 can define a second recess 208A positioned on the second side 22 of the plane 20, as shown in FIG. 4B.

As discussed further below with reference to FIGS. 4A and 4B, the liner 200 can be configured to hold or contain the one or more substances 302 when the liner 200 is positioned in the recess 105 and/or when the liner 200 is removed from the recess 105. FIG. 4A illustrates the liner 200 in the first configuration 200A, and FIG. 4B illustrates the liner 200 in the second configuration 200B. As show in FIG. 4A, the liner 200 can be configured to hold or contain the one or more substances 302 when the liner 200 is in the first configuration 200A. The liner 200 can be configured to hold or contain the one or more substances 302 when the liner 200 is positioned in the recess 105 of the body 104. The one or more substances 302 can be placed or inserted into the recess 208 via the opening 210. In some embodiments, the one or more substances 302 can be placed or inserted into the recess 208 when the one or more substances 302 are in the liquid state or the viscous liquid state. When the one or more substances 302 are in the liquid or the viscous liquid state, the one or more substances 302 can flow along the inner surface 202B of the bottom 202 of the recess 208 so the one or more substances 302 are positioned on and/or cover the inner surface 202B of the bottom 202 of the recess 208. In some embodiments, the one or more substances 302 can be placed or inserted into the recess 208 at a temperature above the particular temperature when the one or more substances 302 are in the liquid state. When the one or more substances 302 cool below the particular temperature, the one or more substances 302 can transition from the liquid state to the solid state and the one or more substances 302 can be a same shape as the recess 208.

In some embodiments, the one or more substances 302 can be manipulated or scraped (e.g., via the removal tool 304) when the liner 200 is positioned in the recess 105 of the body 104 to remove the one or more substances 302 from the recess 208 of the liner 200. In some embodiments, the liner 200 can be removed from the recess 105 of the body 104, and liner 200 can be flexed or bent and/or the one or more substances 302 can be manipulated or scraped (e.g., via the removal tool 304) to remove the one or more substances 302 from the recess 208 of the liner 200. In some embodiments, the liner 200 and the one or more substances 302 can be removed from the recess 105 of the body 104 and the liner 200 can be heated to remove the one or more substances from the recess 208 of the liner 200.

In some embodiments, the liner 200 can be flexed, bent, or moved from the first configuration 200A to the second configuration 200B (i.e., turned inside out) so the one or more substances 302 positioned on the inner surface 202B of the bottom 202 can be removed from the inner surface 202B. As shown in FIG. 4B, the inner surface 202B of the bottom 202 can be positioned above the sidewall 204 of the liner 200 relative to the opening 210 (i.e., towards the top of FIG. 4B). Accordingly, the sidewall 204 and/or the size of the opening 210 can not obstruct, prevent or inhibit the user from manipulating or scraping the one or more substances 302 to remove the one or more substances 302 and/or the portion 302A of the one or more substances 302 positioned or located at or near the perimeter of the bottom 202. In some embodiments, a removal tool 304 larger than the opening 210 can be used to manipulate or scrape the one or more substances 302 to remove the one or more substances 302 from the liner 200.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

SUMMARY

Several illustrative examples of container and removable liners have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of containers and removable liners and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. A container system comprising:
   a body comprising:
     a first recess;
     a first opening to the first recess, the first opening positioned at a top end of the body; and
     a depression extending from the top end of the body, wherein the depression extends around only a portion of the first opening;
   a cap configured to threadably couple to threads positioned around an outer surface of a neck portion of the body to cover the first opening; and
   a liner, the liner comprising:
     a second recess;
     a second opening to the second recess, and
     a rim extending around the second opening;
   wherein the liner is configured to hold a substance in the second recess, wherein the liner is configured to be removably inserted into the first recess, wherein the liner is configured to be turned inside out, and a bottom of the liner is configured to be pushed through the second opening to turn the liner inside out, wherein the depression forms a gap between the rim and the body when the liner is positioned in the first recess.

2. The container system of claim 1, wherein the rim is recessed from the first opening of the body when the liner is positioned in the first recess.

3. The container system of claim 2, wherein the body further comprises a lip extending around the first recess, wherein the lip is positioned a distance from the top end of the body, and wherein the lip is configured to contact the rim of the liner when the liner is inserted into the first recess.

4. The container system of claim 3, wherein the distance is larger than a height of the rim so the rim is recessed from the top end of the body.

5. The container system of claim 1, wherein the liner comprises silicone and/or silicone rubber.

6. The container system of claim 1, wherein the liner is flexible and/or heat resistant.

7. The container system of claim 1, further comprising a seal positioned between the cap and the body so the seal extends across the first opening.

8. The container system of claim 7, wherein the seal is induction sealed to the body in order to hermetically seal the first opening.

9. The container system of claim 1, wherein the body further comprises a lip extending around the first recess, wherein the lip is positioned a distance from the top end of the body, and wherein a portion of a sidewall of the body between the lip and the first opening includes a circumferential portion extending circumferentially around the first opening, and wherein a width of the circumferential portion of the sidewall is larger than a width of the depression.

10. A method of assembling a container, the method comprising the steps of:

inserting a liner into a first recess of a body of the container through a first opening in the body of the container;

threadably coupling a cap to a neck portion of the body to cover the first opening, wherein the cap is threadably coupled to threads positioned around an outer surface of the neck portion, wherein the liner comprises:

a bottom positioned at a first end;

a sidewall coupled to a perimeter of the bottom, wherein the bottom and the sidewall form a second recess;

a second opening to the second recess at a second end; and a rim extending radially outward from the sidewall, wherein the rim defines the second opening, wherein the sidewall and the bottom are flexible so the liner is configured to be turned inside out, and the bottom of the liner is configured to be pushed through the second opening to turn the liner inside out, wherein the rim of the liner contacts a lip in the first recess of the body when the liner is inserted into the first recess of the body; and removing the liner from the first recess by inserting an item into a depression forming a gap between the rim of the liner and the body, wherein the depression extends from a top end of the body into a portion of a sidewall of the body between the lip and the first opening, wherein the depression extends around only a portion of the first opening.

11. The method of claim 10, further comprising induction sealing a seal to a top end of the body so the seal covers the first opening.

12. The method of claim 10, wherein the portion of the sidewall between the lip and the first opening includes a circumferential portion extending circumferentially around the first opening, and wherein a width of the circumferential portion of the sidewall is larger than a width of the depression.

13. The method of claim 10, further comprising, after removing the liner from the first recess, turning the liner inside out by pushing the bottom of the liner through the second opening.

14. A container comprising:

a body comprising:

a first recess comprising a sidewall;

a first opening to the first recess, the first opening positioned at a top end of the body;

a lip positioned in the first recess a distance from the first opening; and a depression extending from the top end of the body into a portion of the sidewall between the lip and the first opening, wherein the depression extends around only a portion of the first opening;

wherein the depression is configured to form a gap between a rim of a liner positioned in the first opening and the body when the liner is positioned in the first recess to provide access to the rim so a user can insert an object into the depression to remove the liner from the first recess.

15. The container of claim 14, further comprising the liner, the liner comprising:

a second recess;

a second opening to the second recess, and the rim extending around the second opening;

wherein the liner is configured to hold a substance in the second recess, wherein the liner is configured to be removably inserted into the first recess.

16. The container of claim 14, wherein the portion of the sidewall between the lip and the first opening includes a circumferential portion extending circumferentially around the first opening, and wherein a width of the circumferential portion of the sidewall is larger than a width of the depression.

17. The container of claim 14, wherein an outer edge of the depression is positioned radially outward from the portion of the sidewall between the lip and the first opening.

18. The container of claim 14, wherein the depression is sized such that a portion of the depression is aligned with the rim of the liner when the liner is positioned in the first recess.

* * * * *